E. Dickerman,
Wringer,
No. 1,119. Reissued Jan. 8, 1861.
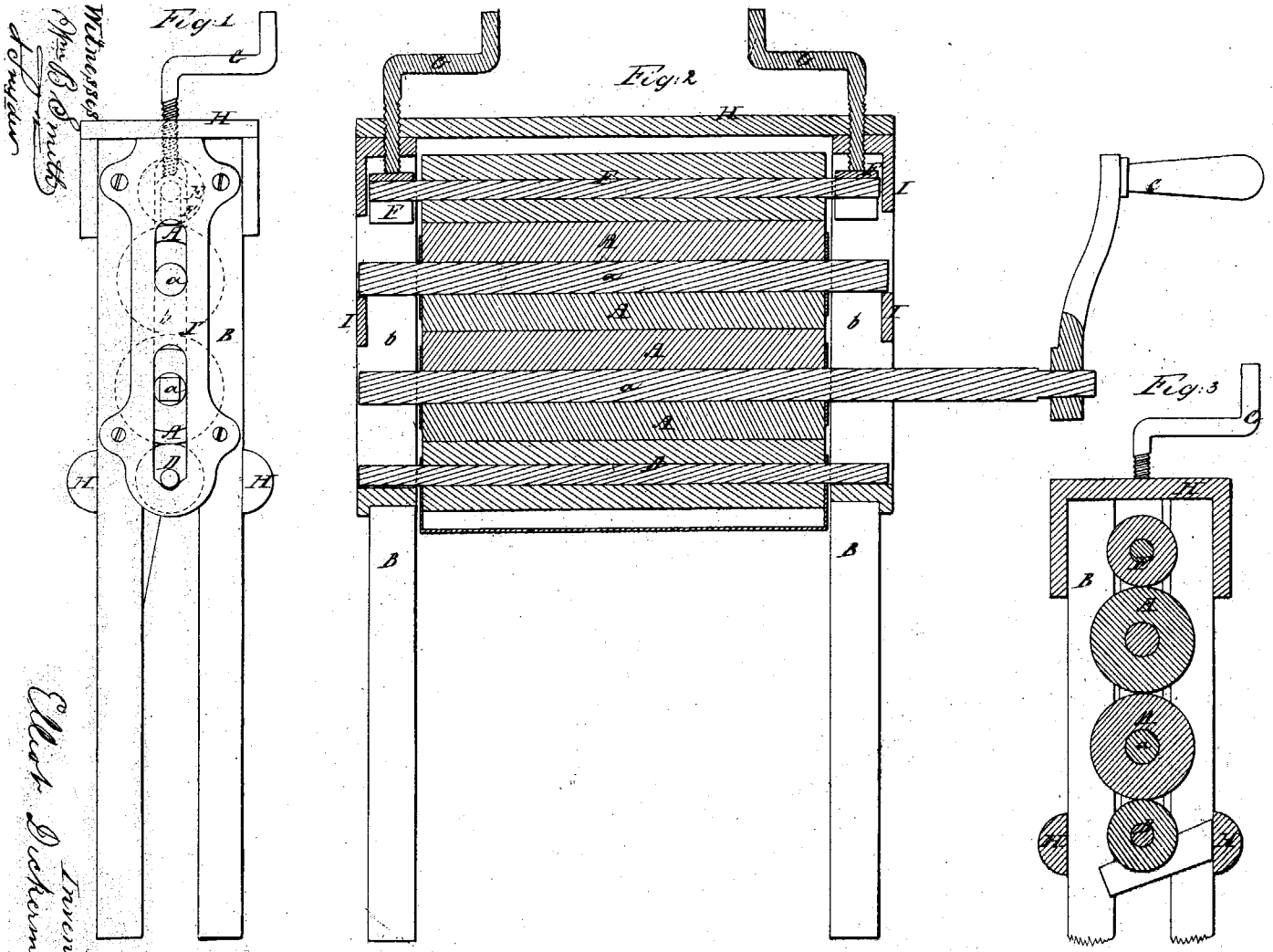
Witnesses
Wm. B. Smith
J. Snyder
Inventor
Elliot Dickerman
N. PETERS, PHOTO-LITHOGRAPHER, WASHINGTON, D. C.

UNITED STATES PATENT OFFICE.

ELLIOT DICKERMAN, OF RICHMOND, VERMONT.

IMPROVED CLOTHES-WRINGER.

Specification forming part of Letters Patent No. 27,781, dated April 10, 1860; Reissue No. 1,119, dated January 8, 1861.

*To all whom it may concern:*

Be it known that I, ELLIOT DICKERMAN, of Richmond, in the county of Chittenden and State of Vermont, have invented a new and useful Improvement in Clothes-Wringers; and I do hereby declare that the following is a full, clear, and exact description of the same, reference being had to the annexed drawings, forming part of this specification, in the several figures of which similar letters of reference denote the same parts.

Figure 1 is an end elevation. Fig. 2 is a longitudinal vertical section. Fig. 3 is a transverse section.

My invention relates to clothes-wringing machines in which the clothes are, as it is technically termed, "wrung," or the moisture partially expelled therefrom, by compression between rollers. Machines wringing in such manner are in common use, the rollers in some being entirely of rigid material, as is much used in Great Britain, and in others having an elastic coating. In some machines the bearings of one or both of the rollers are carried in slots in the framing, and are pressed upon by a spring or springs, so as to move toward and from the clothes, which are operated upon according to the thickness of the latter; but the springs in all such machines previous to my invention pressed upon the journals of the rollers and not upon the middle or working portion thereof. In my invention I make one or both of the rollers which act directly upon the clothes elastic, or with an elastic coating, and allow the axis or axes thereof to move toward and from the clothes being operated upon, and in connection therewith I back such roller or rollers by another roller or other rollers, so arranged as to press upon the surface of the elastic roller or rollers at a point or points thereon diametrically opposite the point where the clothes are acted upon. This expedient supports the elastic roller or rollers against transverse strain and allows the use of a slenderer core than heretofore, and thus with the same thickness of elastic coating a slenderer and consequently a cheaper roller suffices. Other and great advantages result from my invention, one of which is that the compressing of the coating on one side of the elastic roller, due to the pressure of the clothes thereon, induces a corresponding compression on that side in contact with the backing roller, thereby rendering available the elasticity of a greater portion of the elastic material at one time, so that a less thickness of elastic coating suffices.

To enable others skilled in the art to make and use my invention, I will proceed to describe its construction and operation by the aid of the drawings.

I prefer to make both the rollers which act directly upon the clothes with an elastic coating, and to mount and back it according to my invention, and shall so represent and describe the machine in conformity with the 6th section of the act of Congress approved July 4, 1836; but one of such rollers may, if preferred, be of any other character and differently mounted, and the other alone may be constructed and backed as described below.

A A are hollow cylinders of india-rubber. *a a* are cylindrical axes or shafts of iron fitted therein. B B are upright posts, and *b b* are slots therein, in which the ends of A A are supported so as to be free to move vertically. One of the axes *a* is extended, as represented and provided with a crank, C, by which it may be rotated.

D is a rigid roller, equal in length to A. The shaft of D is supported in the lower ends of the slots *b b*. E is a corresponding rigid roller. Its shaft is supported in the slots *b b*, above the elastic rollers A A, being inclosed in boxes or saddles, F F, fitted therein so as to be free to slide vertically. G G are screws adapted to press upon F F, as may be required. Braces H H connect the uprights B B above and below the rollers, so as to form a rigid frame. The lower extremities of B B are forked and adapted to support the machine upon a wash-tub or other suitable vessel for containing the clothes to be operated upon. Castings I I are fitted upon the uprights B B to aid in supporting the strain of the machine, and to protect the sides of the slots *b b* from any wear, so as to hold the axes of the several rollers accurately in line. These castings may be removed and new ones substituted when they become worn or defective.

By turning the crank C motion is given to all the rollers, by reason that all are in contact each with the other and so mounted as to rotate freely.

The operation is as follows: The machine being mounted on the side of a tub, and the screws G G turned to press upon the boxes F F, the crank C is grasped in the right hand and turned around, while any accessible portion of a garment is grasped by the left hand and inserted between the rollers A A, and delivered on the opposite side of the machine. The material of these rollers yields by its elasticity at the points in contact with the garment, pressing thereon with a force depending on the mass of the clothing inserted, and inducing a tendency in the rollers A A to separate each from the other. This tendency is resisted not by the shafts thereof, as would be the case were these rollers mounted as ordinarily practiced, but by their contact with the rigid rollers D or E the lower elastic roller pressing downward against D, and the upper pressing upward against E. The pressure against these rigid rollers induces a yielding of the elastic material at the points of contact therewith, which yielding allows the axes of the elastic rollers to move slightly in the slots *b b*, the axis of the upper elastic roller rising and of the lower elastic roller sinking in said slots to an extent depending on the size of the mass being operated on. When the garment, or the thickest portion thereof, has passed through the machine, the elasticity of the elastic rollers A A induces an entire or partial closing of the rollers A A together, the elasticity of those portions in contact with D and E contributing equally with the elasticity of those portions in contact with the garment to produce this effect. As the garment leaves the machine, the elastic rollers A A assume their first condition, the axis of each approaching that of the other by moving freely in the slots *b b*.

The rollers D E, I term "backing rollers," by reason of their action in receiving and sustaining the pressure transmitted through the elastic rollers.

The advantages due to my invention are that a smaller quantity of rubber suffices to produce the wringing effect, and that this effect is more uniformly produced on all parts of the clothing whether inserted in thick or thin masses, or in both, at the same moment. These advantages are due to the facts, first, that a thinner or more slender shaft may be used as a core for the rubber rollers, because of the efficient support afforded over their entire length. This requires less rubber in order to produce a coating of equal thickness than if a larger core were necessary; second, that the compression or extension of the rubber on the side next the backing roller at the same time that a corresponding action is exerted on the side next the garment causes the elasticity at both points to contribute to and aid each other in producing the proper effect; and, third, that the character of the elasticity thus obtained differs from that which is produced by placing springs to bear upon the ends of the shafts of rollers, by tending to hold the rollers more uniformly parallel when large masses are received near one end.

I can, if desired, insert rubber or other springs to bear in the usual manner upon the ends of the shafts of D or E, so as to produce an elasticity additional to that derived from the material of the rollers A; but I do not usually find it necessary.

I am aware of the use of rubber as a covering for rollers used for wringing clothes; but in all cases heretofore known a single thickness of this covering is alone available as regards elasticity. I do not claim the use of rubber for such purpose, broadly considered; but,

Having now fully described my invention, what I claim as new therein, and desire to secure by Letters Patent, is—

In machines for drying clothes by compression between rollers, employing as one or both of the rollers for acting upon the clothes a rubber-coated or equivalent elastic and non-absorbent roller, A, so mounted in a suitable framing, B B, that the compression of the elastic material on that side which is acting upon the clothes is attended by a corresponding compression of the elastic material against a roller, D or E, on its opposite side, as and for the purposes herein set forth.

In testimony whereof I have hereunto set my name in the presence of two subscribing witnesses.

ELLIOT DICKERMAN.

Witnesses:
WM. B. SMITH,
A. SNYDER.